(12) United States Patent
Kongsgaard

(10) Patent No.: US 6,571,741 B1
(45) Date of Patent: Jun. 3, 2003

(54) STY FOR SOWS HAVING PIGLETS

(75) Inventor: Bjarne Kongsgaard, Silkeporg (DK)

(73) Assignee: Ikadan System A/S, Ikast (DK)

( * ) Notice: Subject to any disclaimer, the term of this patent is extended or adjusted under 35 U.S.C. 154(b) by 0 days.

(21) Appl. No.: 09/743,515

(22) PCT Filed: Mar. 26, 1999

(86) PCT No.: PCT/DK99/00181

§ 371 (c)(1),
(2), (4) Date: Jan. 11, 2001

(87) PCT Pub. No.: WO99/51084

PCT Pub. Date: Oct. 14, 1999

(30) Foreign Application Priority Data

Apr. 2, 1998 (DK) ................................................. 0468/98

(51) Int. Cl.$^7$ ................................................. A01K 1/02
(52) U.S. Cl. ........................................ 119/503; 119/509
(58) Field of Search ............................... 119/503, 502, 119/506, 508, 509, 507, 514, 115, 516, 521, 416, 525, 528, 529, 526, 439; D12/203

(56) References Cited

U.S. PATENT DOCUMENTS

| 360,928 | A | * | 4/1887 | Tebbutt |
|---|---|---|---|---|
| 975,649 | A | * | 11/1910 | Spelts |
| 2,940,423 | A | * | 6/1960 | Frye |
| 3,237,600 | A | * | 3/1966 | Behrens et al. |
| 3,418,975 | A | * | 12/1968 | Smith |
| 3,699,926 | A | * | 10/1972 | Stockl ........................... 119/28 |
| 3,884,188 | A | * | 5/1975 | Arends .......................... 119/20 |
| 5,293,834 | A | * | 3/1994 | Keuter ........................... 119/20 |
| 5,809,937 | A | * | 9/1998 | Hurnik et al. ............... 119/503 |
| 5,911,195 | A | * | 6/1999 | Tripp et al. .................. 119/450 |
| 5,970,919 | A | * | 10/1999 | Mooney ...................... 119/526 |

FOREIGN PATENT DOCUMENTS

| DE | 1212770 | 3/1966 | |
|---|---|---|---|
| DE | 3146741 A1 | * 7/1983 | ............ A01K/1/02 |
| DE | 3403930 | 8/1985 | |
| DE | 3620089 | 1/1987 | |
| EP | 0 360 308 | 3/1990 | |
| FR | 2559999 | 2/1984 | |
| GB | 2321839 | 8/1998 | |
| NO | 180401 | 1/1997 | |
| SE | 501972 | 7/1995 | |

* cited by examiner

Primary Examiner—Peter M. Poon
Assistant Examiner—Andrea M. Valenti
(74) Attorney, Agent, or Firm—James Creighton Wray; Meera P. Narasimhan

(57) ABSTRACT

A sty for sows having piglets is described. The sty may be built having the same area requirements as for sties for bounded sows, but may be used for untethered sows. This takes place in that a rectangular sty department is divided by a diagonal wall which is adjacent to a corner of a rectangular climate department for piglets which are placed at each corner of the sty department. In order to establish natural lying positions for the sow, the sty comprises mounted devices in the floor which simultaneously protects the piglets against squeezing when the sow lies down.

16 Claims, 3 Drawing Sheets

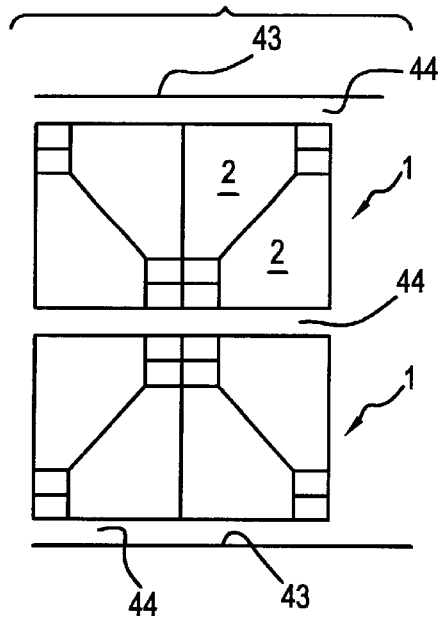
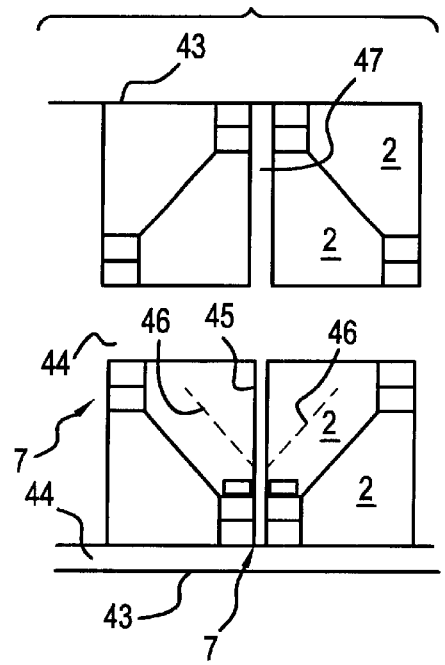
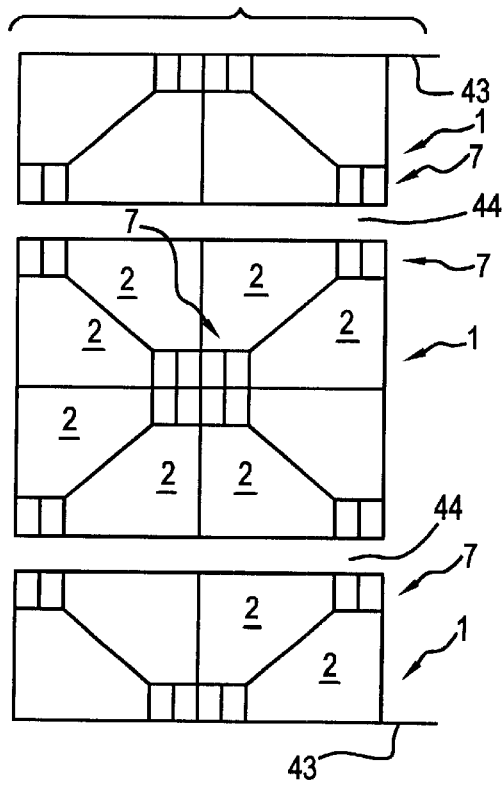

STY FOR SOWS HAVING PIGLETS

The present invention relates to a sty for sows having piglets. Moreover, the invention relates to a device for protecting the piglets against squeezing when the sow lies down.

It is well known to build sties for sows having piglets according to different principles dependent upon whether the sows are bound or allowed to walk freely within the sty. In the most recent years it has been usual to place the sows in the so-called farrows sties in which the sow is bound. The piglets can then walk freely on each side of the sow and will also have a possibility for placing themselves on a hot plate or its like in a climate department in which a comfort temperature exists which has been adjusted to the piglets. In order to avoid that the piglets are squeezed to death under the sow when it lies down, protecting devices are applied in form of metal bars on each side of the sow. When the sow lies down the piglets can escape to the free area on each side of the sow.

In stables for untethered sows protecting rings will be placed along the walls of the sty, which protecting rings will impede the piglets from being squeezed against the walls. By a loose-housing system the sow can usually place itself along any wall or in any position on the floor. The known sties for loose-housing system are disadvantageous by being very room demanding in relation to the room required in sties where the sows are bound.

In the recent years there has been an increased understanding to use sties where the sows having piglets can walk freely around and optionally lie down in various positions. This wish has until now not been so widespread because of the essentially increased costs due to the bigger requirement for room. Moreover, many stables are today built according to modules which are determining for the total size of the stable, the placing for the transference devices for feed, water and the like. Moreover, these modules are determining with respect to the placing of the walls for division of the stable in various sty sections.

In the known stables where sows are with piglets until they are weaned from the mother sow, there is an additional disadvantage. This disadvantage is to be seen in the requirement for frequent cleaning. Each time a sty is emptied both the sow and the piglets are removed from the sty and there will be a need for cleaning before new animals are placed in the sty.

In spite of an increased industrialisation within pig breeding there has until now been no suggestions about the building of stables in a way which considers the wish about the loose-housing system, which considers the need of the sow to move around freely and with the avoidance of the risk of squeezing the piglets and which concurrently makes it possible to have an effective use of the stable which is comparable to the use of the room which is known from stables with binding of the sows.

In an example of a sty which partly considers the above wishes about a loose-housing system is described in Norwegian Patent No. 180,401. Here it is described how a sty can be build with two or more boxes within four outer walls. The boxes are subdivided by means of further dividing walls to create room for sows and for piglets. By increase of the piglets the central dividing walls can be moved and/or removed so that the piglets can walk within the same four outer walls under growth and fattening until slaughtering. The building of these sties makes it impossible to consider the module measures which are used in existing sties with clamping. Even though the sties are made to be usable during the growth of the pigs, a wish of effective use of the stable area has not been fulfilled.

SUMMARY OF THE INVENTION

It is the object of the present invention to provide a building of a stable which considers these wishes and which simultaneously enables it to make a rebuilding of the existing sties in which the animals are bound to sties where the animals are loose without any need for essential rebuildings or changes in the existing modules which are used in the various building elements in the stable.

This is achieved by the present invention with a sty in which a rectangular sty department results by means of four walls where in a corner or in two diagonally opposite corners of the sty department a substantially rectilinear climate department for the piglets is formed where a substantially diagonal wall has been placed adjacent to that or those inner corners of the climate departments to form two separate substantially triangular sties where at least the diagonal wall is so long that the sow may lie along this, and where each sty comprises mounted devices in the floor to protect the piglets against squeezing when the sow lays down.

The protection device according to the invention is characterized in that it comprises means for mounting in the floor of a sty that it is mushroom-shaped and has a substantially cylindrical stem and a substantially ball-shaped hat and which have a greatest height above the floor which makes it possible for the sow to walk across it, and a dimension to the underside of the hat which makes it possible for the piglets to walk under it.

With such a sty it is possible that the four walls which provide the rectangular sty department can be placed according to the same modules or even be existing separating walls from a stable with bound sows. By placing the climate departments in each diagonally opposite corner and divide the sty with a diagonal wall a sufficient length is obtained so that a sow at least can lie down along the diagonal wall. If existing modules are used, one of the outer walls will also have a sufficient length so that the sow may lay down along this wall.

According to a preferred embodiment, the protection device is characterized in that it is fastened to the floor by means of a resilient bar which at the lower end has a hook which may be displaced down in between two grid bars in the floor, and may be rotated to a position for engagement under the grid bars by means of a control lever on the top side of the ball. Hereby it is possible to quickly and in a simple manner to move or to remove the device if it is no longer needed, whereby the whole floor area will be free.

The climate departments which are placed in the corner can be provided with hot plates or other hot devices and have a cover to create the wanted comfortable temperature for the piglets. Each of these climate departments will at one side be closed towards one of the sty sections while another side will turn towards the sty where the mother sow is placed.

By placing protecting devices which prevent the squeeze of the piglets against the floor a freedom is obtained in relation to the known placing where protection rings traditionally are used which are fastened to the side walls. By mounting protecting devices in appropriate positions a security is thus obtained against squeezing of the piglets when the sow lays down in one or another position. The positioning of the protecting rings may simultaneously be determining for the forming of the natural laying down positions of the sow within the sty in such a way that the piglets always can escape.

Each rectangular sty department which comprises two triangular sties can be prepared by letting the rectangular sty department have a width between 2000 and 2600 mm, preferably between 2200 and 2400 mm and a length between 2800 and 3400 mm, preferably between 3000 and 3200 mm and that each climate department has a width between 500 and 700 mm, preferably 600 mm, and a length between 700 and 900 mm, preferably 800 mm. These measures correspond to the known modules when building sties where the sows are bound. In the known stables such a rectangular sty department will thus comprise two rectangular sties, where a sow is bound in each sty having the head oriented in the one direction.

By building the sty according to the invention it will be possible to place the climate department for the piglets in one corner or to place a climate department in two diagonal opposite corners of the sty. If the climate department is placed in the one corner of the sty section each of the two climate departments will additionally have a triangular form, because they then will be divided by a diagonal wall within the climate department.

However, it is preferred that a climate department is placed in each diagonally opposite corner of the sty. In this embodiment a prolongation of the diagonal wall is established having a side wall for each climate department, so that this will have a closed side towards the other sty and an open side leading to the sty where the mothersow walks. In this embodiment the feed and drinking trough of the sow will preferably be placed in that corner of the sty which is adjacent to the climate department of the neighbouring sty.

The animals can be fed with a central feeding plant having pipe feeding automatic machines which are well-known within the art. By placing the feeding troughs in each diametrically opposite corner of the sty department two parallel transference pipes for feeding/water will thus be applied. Alternatively, a central feeding transference pipe having a branch to each of the two feeding/drinking troughs can be applied.

Although the sty is arranged for a untethered sow it will appropriate to be able to use the stable for fixing of the sow if it is an aggressive sow where there is a risk that the piglets will be eaten. This may be obtained if the sty is characterised in that at least a part of the outer wall is hinged to the remaining part of the outer wall in a position close to the trough of the sow and that said part is arranged for being swung to and remain fastened in a position parallel to the diagonal wall. It will thus be possible to fix the sow and reduce the risk that she will attack the piglets.

It is preferred that the upper part of the side wall is swung into the sty and leave a lower part of the side wall in its original position in order to hinder the piglets from running out from the sty. It will be sufficient to swing the upper part of the side wall into the sty in order to hinder the free movement of the sow. The part of the outer wall which is swung into the sty may by means of a connecting rod be fastened to the diagonal wall and/or by means of a post which is mounted in the floor of the sty. Moreover, a pivoting part of the outer wall will ease the user's access to the sty which may be appropriate when the piglets are to be looked after and possibly are to be given medicine.

In order to create comfort by the sow and piglets it is preferred that a sty according to the invention is characterised in that at the corner of the sty by the climate department a dosing device is procured which is arranged for dosage of bedding out on the floor of the sty as a consequence of the influence from the animals and which is connected with a central supply plant or a funnel formed container in each sty. Due to the nature of the animals and as the dosing device is placed close to the climate department a spreading of the bedding in the climate department and on the floor of the sty which is adjacent to the climate department will take place. It will thus be possible to make an automatic bedding in the sty by means of the dosage device.

The protecting devices will preferably be mushroom-shaped devices which substantially have a cylindrical stem and a substantially ball-shaped hat and which have a biggest height over the floor which makes it possible that the sow can walk across them and a dimension to the underside of the hat which makes it possible that the piglets can walk under them. These are fastened to the floor by means of a resilient bar which at a lower end is provided with a hook which may be displaced downwards into an opening, preferably between two grid bars in the floor and may be rotated to a position for engagement under the grid bars by means of a normal control lever upon the top side of the ball.

It is preferred that these protecting devices at least are placed on a row along at least one wall along which the sow may lie down. In each row a number of between two and five protecting devices are used. The number depends on the actual length of the wall and the length of the sow. Thus a number of devices are used which ensures that a free side wall having a length which is longer than the length of the sow does not occur.

It is preferred to place two to three protecting devices quite close to the diagonal wall and at each of the two outer walls in the sty. In order to ensure that the sow lies down in natural lay positions relatively close along one of the outer walls it is preferred also to place three protecting devices in the middle of the sty. Hereby three oblong lie areas along each of the side walls of the sty are formed.

As the protecting devices have a highest height which makes is possible that the sow can walk across them the sow will have a big freedom of movement in the sty and may turn and walk around in the sty for either turning toward the feed trough or the climate department. As the protecting devices are dimensioned so that the piglets may walk under them it is preferred that the ball-shaped hat is very flat and possibly can assume a very flat oval cross-section.

The protecting devices which are mounted inside the sty will preferably be made of plastic. In a specific simple embodiment they can be made of a ball which is placed on the end of a cylindrical pipe which again stands on a baseplate having a larger diameter to secure a stabile placing on the floor. Through these elements a spring bar is placed consisting of an outer and inner pipe which are in a resilient engagement with each other and where a hook is placed at the lower side of the inner pipe, which hook can swing underneath the grid bars in the floor. This is a particularly simple construction which makes a fastening of the different elements in the protecting device with the protecting device fastened concurrently in a random position on the floor surface.

Preferably, the floor surface in the sty will be built of grids and will preferably be built of grids having known module measures of 40×60 cm. With these module measures for a sty four grids will be used in the width of a rectangular sty department and in the longitudinal direction of the sty department eight rows will be used. In the climate department hot plates will preferably be used which are settable in a frame having module measures corresponding to the module measures for the individual grids. The grids which are used for the floor will preferably by plastic grids. Alternatively, also grids made of cast iron or concrete may be used and it will also be possible to build a sty according to the invention having a firm sty floor.

DESCRIPTION OF THE DRAWING

The invention will hereafter be explained in more detail with reference to the accompanying schematic drawing, in which

BRIEF DESCRIPTION OF THE DRAWINGS

Figure 1:
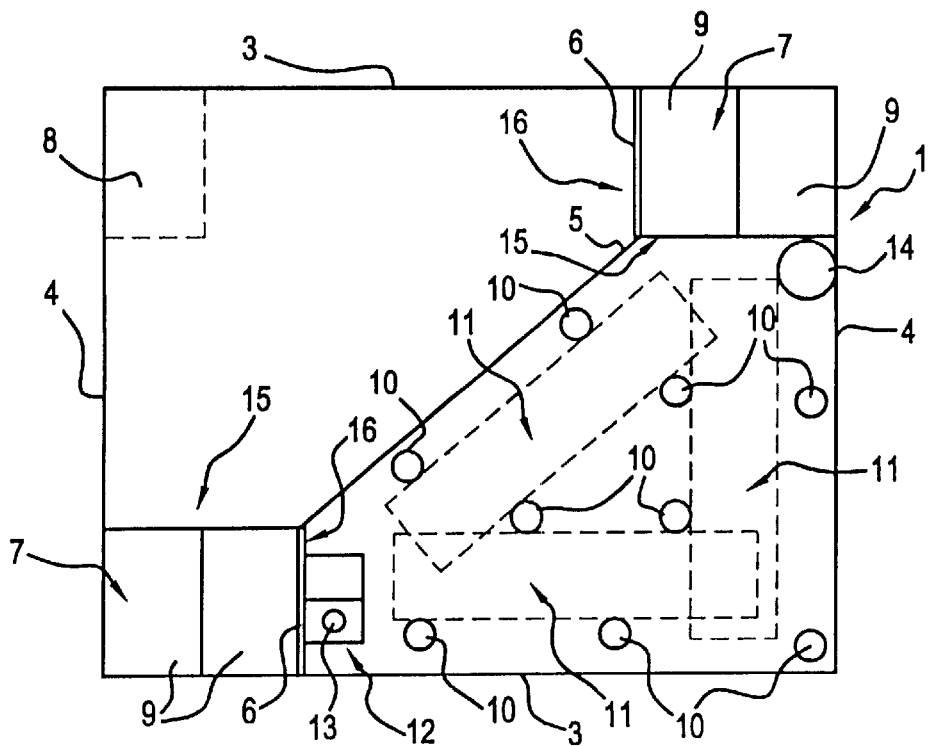
Figure 2:
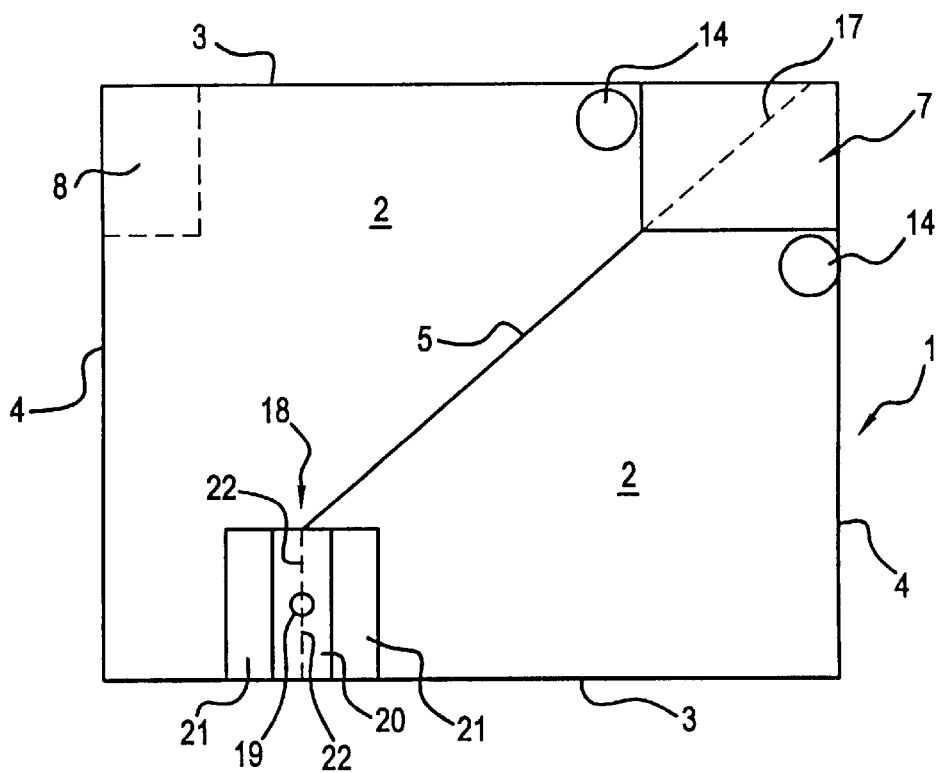
Figure 3:
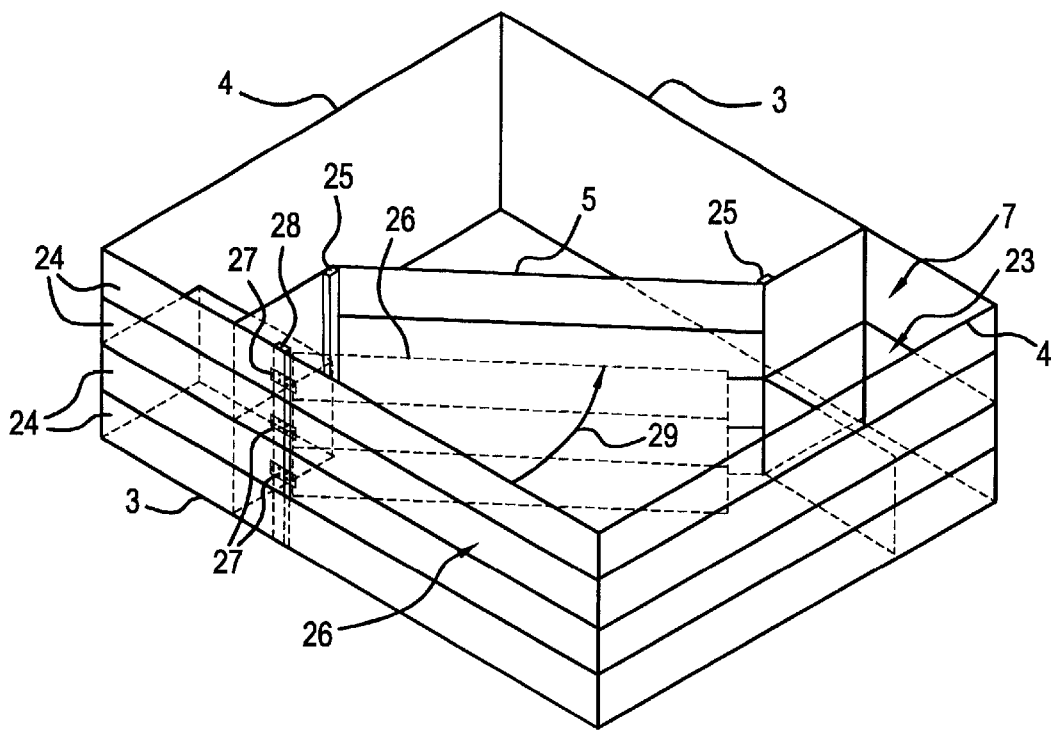
Figure 4:
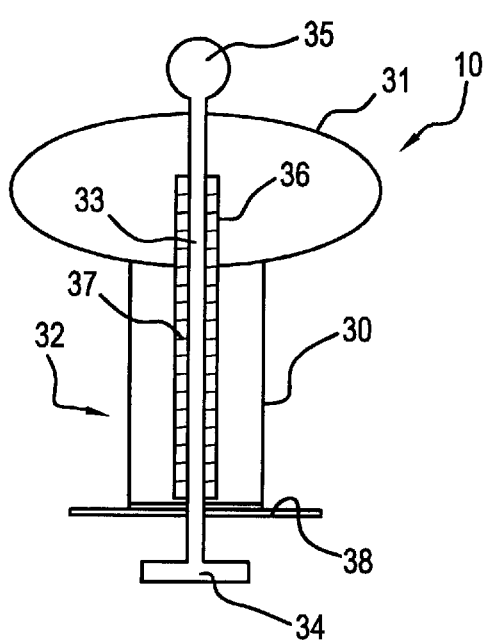
Figure 5:
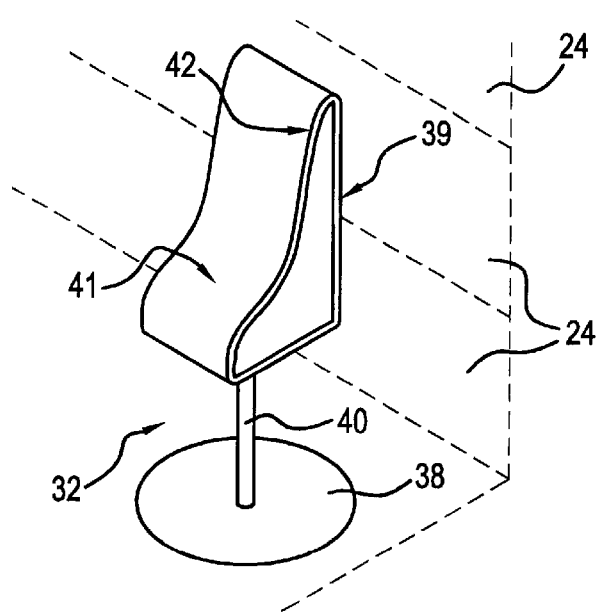

FIG. 1 shows a plane view for illustration of a preferred embodiment of a sty according to the invention, FIG. 2 shows a view corresponding to FIG. 1 for illustration of an alternative embodiment for a sty according to the invention, FIG. 3 shows a perspectival view for illustration of a sty corresponding to the embodiment shown in FIG. 1, FIG. 4 shows a sectional view through a protecting device for use in the sty according to the invention, FIG. 5 shows a perspectival view for illustration of a further embodiment for a protecting device, and FIGS. 6–8 show plane views of various stable buildings having a sty according to the invention.

DETAILED DESCRIPTION

In the different figures on the drawings identical or corresponding elements will be indicated with the same reference number and a specific explanation to each figure will therefore not be given. For the sake of the clearness certain parts are left out in the figures, as the figures only illustrate those elements which are necessary for the understanding of the invention.

In the figures a rectangular sty department 1 is shown which contains two substantially triangular sties 2. The rectangular sty department 1 is established by means of two pairs of opposite side walls 3, 4. The division of the sty department 1 in the two sties 2 takes place by means of a diagonal wall 5.

At each end the diagonal wall 5 in FIG. 1 is extended with an additional wall 6 which is adjacent to a climate department 7 for the piglets.

In the upper left corner in the sty department 1 a floor grid 8 is indicated. The floor grid 8 contains a module measure which preferably will be 400×600 mm and which is used when building the sty department. Thus, this size is also recovered in the two hot plates 9 which are indicated in each of the climate departments 7.

The sty department 1 which is illustrated is in principle a sty department which is known from stables where sows are bound. In such an embodiment the sty department 1 would comprise two rectangular sties which are placed side-by-side.

For the sake of clearness only elements in one of the two sties are shown in FIG. 1. However, the two sties 2 will be built identically. Thus, the sty 2 comprises a number of protecting devices 10 which are mounted in the floor. The protecting devices, which will be explained in more details in the following, are substantially mushroom-shaped. They are placed in a row containing two protecting elements 10 in a position close to the diagonal wall 5 and in a position close to the side wall 4 of the sty and the side wall 3 of the sty. In the middle of the sty three protecting devices 10 are placed in an triangular configuration.

With the embodiment shown a sow which is placed in the sty will have three schematically indicated lie positions 11 where the sow can lie down along a wall.

The protecting devices 10 have a height so the sow may pass over them and they are also arranged so the piglets may walk under them. Thus the sow move freely in the sty 2. The sty 2 is arranged so that an inscribed circle corresponding to the turning diameter for a sow exists within the formed triangular form. That means in practice a diameter of minimum 1700 mm. The protecing devices secure that the piglets are not squeezed when the sow lies down in one of the lying positions 11.

Moreover, the sty department 1 comprises a feeding/drinking trough 12. This is provided with a vertical feeding pipe 13 and a water pipe (not shown) which may be connected with a central supply plant. As shown in FIG. 1 the trough 12 is placed in that corner of the sty 2 which is adjacent to the climate department 7 of the neighbouring sty. Hereby an efficient use of each sty 2 is obtained.

In that corner of the sty 2 which is placed against the climate department a dosing pipe 14 is illustrated. This dosing pipe is intended for transference of bedding in form of hacked straw, sawdust, chaff or the like. The bedding is dosed out on the floor in that the pipe 14 ends in a short distance above the floor and may be influenced by the animals so that a swing of the pipe will implicate that it is distributed on the floor surface. It is preferred to place the dosing pipe 14 close to the climate department 7 of the sty so that bedding is established in the climate department 7 which will have an open side 15 turning against the remaining part of the sty while the climate department 7 at the other side 16 is closed by the side wall 6.

In FIG. 2 another embodiment is shown in which only one rectangular climate department 7 is used, which is placed in the one corner of the sty department 1. This rectangular climate department 7 is separated by a wall 17 which is a prolongation of the diagonal wall 5. At the opposite corner of the sty department 1 a feeding/drinking trough 18 is placed which has a central feeding pipe 19 which doses feeding down onto a feeding plate 20. On each side of the feeding plate 20 a lowered area 21 is placed for absorbing water and where the animals can take feed down. With this embodiment of the sty which is illustrated in FIG. 2 it will thus be possible to use a simple transference system for feed and water to a single feeding automatic machine which simultaneously serves two sties 2. Such an automatic machine is known within the art. On each side of the feeding pipe 19 a grid wall 22 is located which prevents that the two sows make contacts with each other and which simultaneously prevents that the piglets can pass between the two sties 2.

In the perspective view in FIG. 3 it is shown that the climate department 7 is covered by a plate 23 which reduces the height above the piglets and which therefore increases the temperature of comfort within the climate department 7.

Moreover, FIG. 3 illustrates that the side wall 3, 4 and the diagonal wall 5 are built of planking profiles 24. The planking profiles 24 are preferably plast profiles which are fastened to posts 25 of which only a part is shown.

Moreover, it appears from FIG. 3 that a part 26 of the side wall 3 through hinges 27 is fastened to the remaining part of the side wall 3 and a supporting post 28. The part 26 can therefore be swung in the direction of the arrow 29 into the sty 2 to a position where it is parallel with the diagonal wall 5 as illustrated with dotted lines. In this position it is possible to obtain access to the sty and simultaneously it is possible to fix an aggressive sow in the interspace between the two parallel walls 5 and 26. It is illustrated that the lower plank 24 is not swung into the sty. By fastening one or two lower planks in the side wall 3 there will be no risk that the piglets run out of the sty 2 even though said part 26 of the side wall is used for fixation of the sow.

A sty of the type which is illustrated in FIGS. 1, 2 and 3 is moreover advantageous in connection with the weaning of the piglets from the mother sow. Due to the size of each sty 2 it will be possible in a weaning situation only to remove the sow from the sty and move it to a sow stall. The piglets can remain in the sty and can use the feeding automatic machine in the first part of their growth until they are transferred to a fattening stall. In this way it will be possible to reduce a need for cleaning until that time when the piglets are transferred to a fattening stall and where a new sow is to be placed in the sty 2.

FIG. 4 illustrates schematically an embodiment for the protecting device 10. The protecting device 10 has a substantially cylindrical stem 30 and a substantially ball-shaped hat 31. The ball-shaped hat will preferably have a relatively flat, oval cross-section as the sow has to pass across the upper height and as the piglets have to pass under the hat 31. Thus the piglets in the area 32 under the hat 31 can be protected against squeezing when the sow lies down. The protecting device 10 is fastened to the floor by means of a resilient bar 33. At its lower end the bar 33 has a hook-formed projection, which can be turned into engagement under grid bars when the bar 33 by means of the control lever 35 is pressed down into the outer pipe 36 in direction toward the effect from a spring 37. When the hooks 34 are placed underneath the grid bars the control lever is released and the protecting device will be fastened in the floor as the hook 34 is pressing upwards and thereby presses a base plate 38 into contact with the top side of the floor.

Even though a mushroom-shaped protecting device is shown it will be possible to use other shapes, e.g. an umbrella-shape. It has only to be assured that the device can be placed on the floor in an arbitrary position in the sty to create the needed lying positions for the sow and simultaneously protect the piglets.

In FIG. 5 a protecting device 39 is shown which is intended for being mounted close to a side wall 3, 4 or a diagonal wall 5. The protecting device 39 is fastened in the floor through a bar 40 which works in the same way as the resilient bar 33 and which supports a hat 41 having an oblique supporting plate 42 directed toward the sty and which has a height and angle so it supports the sow when it lies down. Under the hat 41 an area 32 exists for the escape of the piglets. Alternatively, the hat 41 may be hanged on a partition wall or the diagonal wall.

In the FIGS. 6–8 the reference number 43 refers to stable walls and between the sties service passages 44 exist for supervision of the animals. In FIG. 7 a double partition wall 45 is shown which can be swung to the indicated position 46 shown with dotted lines in order to create an easy access to the climate departments 7 from the service passage 44. As an alternative to the pivoting double partition wall 45 secondary service passages 47 may be provided between the sties 2 for access to the climate departments.

What is claimed is:

1. Sty for sows having piglets where by means of four walls a rectangular sty department is provided in which a substantially rectangular climate department for the piglets is made in a corner or in two diagonally opposite corners of the sty department where a substantially diagonal wall is placed, said wall being adjacent to that or the inner corners of the climate departments for forming of two separate substantially triangular sties where at least the diagonal wall is long enough so that the sow can lie down along this and where each sty comprises devices mounted in the floor for protecting the piglets against squeezing when the sow lies down.

2. Sty according to claim 1, characterized in that one of the other walls in each sty also is long enough so that the sow can lie down along this wall.

3. Sty according to claim 1, characterized in that the diagonal wall at each end is extended by a side wall for the climate department thereby forming an open side which ends in a corner of the sty.

4. Sty according to claim 3, characterized in that the feeding/drinking trough for the sow is placed in that corner of the sty which is adjacent to the climate department of the neighboring sty.

5. Sty according to claim 4, characterized in that at least a part of the outer wall is hinged to the remaining part of the outer wall in a position close to the trough of the sow and that said part is intended for being swung and being fastened in a position parallel to the diagonal wall.

6. Sty according to claim 1, characterized in that the rectangular sty department has a width of between 2000 and 2600 mm and a length of between 2800 and 3400 mm, and that each climate department has a width of between 500 and 700 mm and a length of between 700 and 900 mm.

7. Sty according to claim 6, wherein the rectangular sty department has a width of between about 2200 and 2400 mm and a length of between about 3000 and 3200 mm.

8. Sty according to claim 7, wherein each climate department has a width of about 600 mm and a length of about 800 mm.

9. Sty according to claim 1, characterized in that a dosing device is provided in the corner of the sty by the climate department, said dosing device is intended for dosage of bedding out onto the floor of the sty as a consequence of the influence of the animals and which is connected with a central supply plant or a funnel-shaped container in each sty.

10. Sty according to claim 1, characterized in that the protecting devices are mushroom-shaped devices which have a substantially cylindrical stem and a substantially ball-shaped hat and which have a greatest height above the floor which makes it possible for the sow to walk across them and a dimension to the underside of the hat which makes it possible for the piglets to walk under them.

11. Sty according to claim 10, characterized in that the protecting devices are fastened to the floor by means of a resilient bar which at the lower end has a hook which may be displaced down in-between two grid bars in the floor and may be rotated to a position for engagement under the grid bars by means of a control lever on the top side of the ball.

12. Sty according to claim 1, characterized in that at least the protecting devices are placed in a row along at least one wall along which the sow can lie.

13. Sty according to claim 12, wherein each row comprises between about 2 and 5 protecting devices.

14. Sty according to claim 13, wherein each row comprises about 3 protecting devices.

15. Device for protecting the piglets against squeezing when the sow lies down, characterized in that comprising means for mounting in the floor of a sty that is mushroom-shaped and has a substantially cylindrical stem and a substantially ball-shaped hat and which have a greatest height above the floor for allowing the sow to walk across them, and a dimension to the underside of the hat for allowing the piglets to walk under them.

16. Device according to claim 15, characterized in that the stem is fastened to the floor by means of a resilient bar which at the lower end has a hook which may be displaced down in between two grid bars in the floor, and may be rotated to a position for engagement under the grid bars by means of a control lever on the top side of the ball.

* * * * *

UNITED STATES PATENT AND TRADEMARK OFFICE
CERTIFICATE OF CORRECTION

PATENT NO.   : 6,571,741 B1
DATED        : June 3, 2003
INVENTOR(S)  : Bjarne Kongsgaard It is certified that error appears in the above-identified patent and that said Letters Patent is hereby corrected as shown below:

<u>Title page,</u>
Item [75], "Silkeporg" should be -- Silkeborg --.

Signed and Sealed this

Eleventh Day of November, 2003

JAMES E. ROGAN
*Director of the United States Patent and Trademark Office*